United States Patent [19]

Yajima et al.

[11] 4,279,654
[45] Jul. 21, 1981

[54] PROCESS FOR PRODUCTION OF CRYSTALLIZED GLASS AND PROCESS FOR PRODUCING COMPOSITE ARTICLE USING SAID CRYSTALLIZED GLASS

[75] Inventors: Seishi Yajima; Kiyohito Okamura; Toetsu Shishido; Yoshio Hasegawa, all of Oharai, Japan

[73] Assignee: The Foundation: The Research Institute for Special Inorganic Materials, Ibaraki, Japan

[21] Appl. No.: 146,724

[22] Filed: May 5, 1980

[30] Foreign Application Priority Data

May 14, 1979 [JP] Japan .................................. 54-58004
May 21, 1979 [JP] Japan .................................. 54-61515

[51] Int. Cl.$^3$ .............................................. C03C 3/22
[52] U.S. Cl. ..................................... 106/39.6; 51/298; 51/307; 51/308; 51/309; 65/33; 106/39.7; 106/39.8; 106/43; 106/44; 106/47 R; 106/52; 106/53; 106/54; 106/55; 106/56; 106/73.4; 106/73.5; 264/60; 264/62; 264/65; 264/332; 427/376.2
[58] Field of Search ................... 106/39.6, 39.7, 39.8, 106/308 B, 308 Q; 65/33; 427/220, 221, 375; 264/60, 62, 65, 332; 51/298, 307, 308, 309

[56] References Cited

U.S. PATENT DOCUMENTS

| | | | |
|---|---|---|---|
| 3,681,187 | 8/1972 | Bowen et al. | 65/33 X |
| 3,775,164 | 11/1973 | Smith et al. | 106/47 R X |
| 3,811,918 | 5/1974 | Levene | 427/375 |
| 3,847,583 | 11/1974 | Dislich et al. | 65/33 |
| 3,998,617 | 12/1976 | Gliemeroth | 65/33 |
| 4,225,354 | 9/1980 | Rao | 106/39.8 |

OTHER PUBLICATIONS

Mukherjee, S. P. et al. "A Comparative Study of Gels and Oxide Mixtures as Starting Materials for the Nucleation and Crystallization of Silicate Glasses," J. of Mat. Sci. 11 (1976) pp. 341-355.

Yoldas, B. E. "Preparation of Glasses and Ceramics from Metal-Organic Compounds" J. Mat. Sci. 12 (1977) pp. 1203-1208.

*Primary Examiner*—Helen M. McCarthy
*Attorney, Agent, or Firm*—Ladas & Parry

[57] ABSTRACT

This invention relates to a process for producing crystallized glass having superior mechanical properties and thermal properties, which comprises (1) coating glass in the form of a powder or molded article with an organometallic polymer, said polymer being soluble in an organic solvent and having a skeleton comprising (a) titanoxane linkages +Ti—O+ or zirconoxane linkages +Zr—O+ or both and (b) siloxane linkages +Si—O+ in which most of the silicon atoms have as a side chain at least one organic group selected from alkyl and phenyl groups, and optionally (c) boroxane linkages +B—O+ or aluminoxane linkages +Al—O+ or both; and (2) firing the resulting polymer-coated glass in an oxidizing atmosphere to crystallize at least a part of the glass. This invention also pertains to a process for producing a ceramics-crystallized glass composite article using the aforesaid crystallized glass.

9 Claims, 1 Drawing Figure

PROCESS FOR PRODUCTION OF CRYSTALLIZED GLASS AND PROCESS FOR PRODUCING COMPOSITE ARTICLE USING SAID CRYSTALLIZED GLASS

FIELD OF THE INVENTION

This invention relates to a novel process for producing crystallized glass, and specifically to a novel process for producing crystallized glass having very good mechanical properties such as strength and hardness and very good thermal properties such as thermal shock resistance and capable of being mechanically worked into complex profiles by machining, cutting, drilling, etc.

This invention also pertains to a process for producing a ceramics-crystallized glass composite article using the aforesaid crystallized glass.

BACKGROUND OF THE INVENTION

Glass is generally known to be a typical amorphous substance, but crystallized glass having at least a part thereof crystallized is also known. The known crystallized glass is produced by adding an ion such as a titanium, gold, silver, copper, zirconium or fluorine ion or particles such as titanium dioxide as a crystal nucleus-forming material to glass-forming materials, melting the mixture, molding it, cooling the molded article, re-heating the article to a temperature at which the aforesaid ion or particles can easily move thereby forming a compound as a crystal nucleus in the inside of the glass, and further elevating the heating temperature to crystalline the glass. For example, a glass batch having a composition approximating crystals to be precipitated, for example eucryptite ($LiO_2 \cdot Al_2O_3 \cdot 2SiO_2$), is prepared, and 4 to 20% by weight of titanium dioxide (nucleating agent) is added. The mixture is melted and molded and then cooled. The glass is then reheated to form a nucleus while adjusting the temperature to a point about 50° C. higher than the annealing point. Then, the heating temperature is adjusted to a point slightly lower than the transition point to crystallize glass.

Thus, the known process for production of crystallized glass requires a complex cycle of heating-cooling-heating, and moreover, since the conditions for forming the crystals are within a narrow range, the heating temperature must be strictly controlled. Consequently, this process has the defect that the productivity is low, and the cost of production is very high. Another defect is that because the types and proportions of the constituent components of the matrix glass must be selected with a range where crystallization easily occurs, the range of selection of the starting glass becomes narrow.

The present inventors worked extensively to develop a new process for producing crystallized glass, which would eliminate the aforesaid defects. The work finally led to the discovery that by using a specified organomatallic polymer as a nucleating agent, crystallized glass having superior properties can be produced easily and economically.

SUMMARY OF THE INVENTION

According to this invention, there is provided a process for producing crystallized glass having superior mechanical properties and thermal properties, which comprises coating glass in the form of a powder or molded article with an organometallic polymer, said polymer being soluble in an organic solvent and having a skeleton comprising (a) titanoxane linkages (-Ti-O-) or zirconoxane linkage (-Zr-O-) or both and (b) siloxane linkages (-Si-O-) in which most of the silicon atoms have as a side chain at least one organic group selected from alkyl and phenyl groups, and optionally (c) boroxane linkages (-B-O-), aluminoxane linkages (-Al-O-) or both; and firing the resulting polymer-coated glass in an oxidizing atmosphere to crystallize at least a part of the glass.

DETAILED DESCRIPTION OF THE INVENTION

Figure 1:
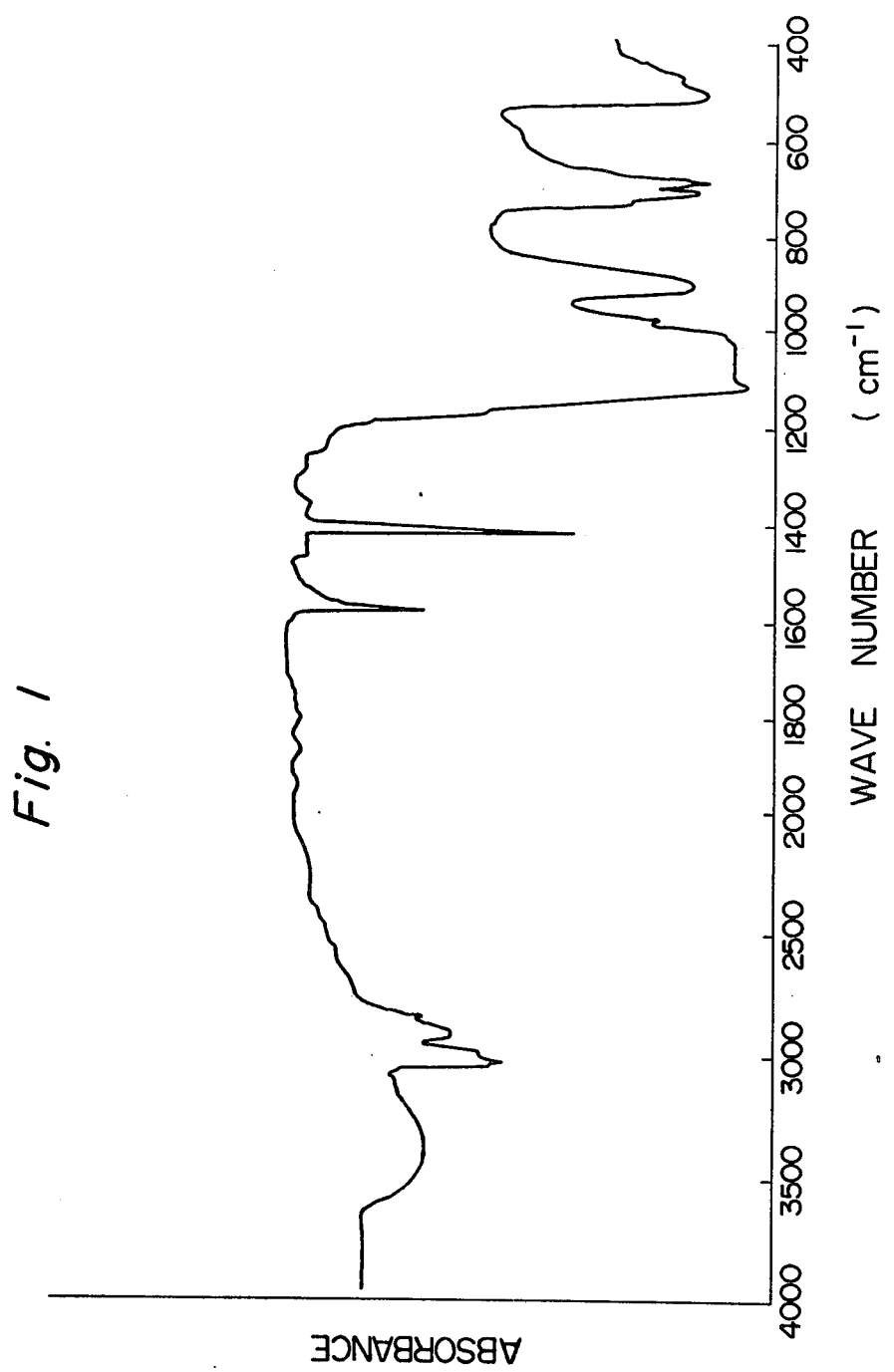
FIG. 1 is an infrared absorption spectral chart of the polymer produced in Example 1 of this application.

The characteristic feature of the process of this invention is that by using a specified organometallic polymer as a nucleating agent, ordinary glass is converted to crystallized glass of very good performance by simple process steps. Some of the organometallic polymers used in this invention are known polymers. However, the use of organometallic polymers as nucleating agents for the crystallization of glass is a new technique not taught at all by the prior art. Accordingly, the present invention provides a novel process for producing crystallized glass.

The organometallic polymers used as nucleating agents in the process of this invention are polymetalloorganosiloxanes containing siloxane linkages (-Si-O-) and metaloxane linkages (-M-O-) (in which M represents a titanium, zirconium, boron or aluminum atom) in their skeleton in which most of the silicon atoms in the siloxane linkages have bonded thereto at least one organic side-chain group selected from alkyl groups (preferably having 1 to 4 carbon atoms) and phenyl groups. These polymers are soluble in organic solvents such as benzene, toluene, xylene, acetone or tetrahydrofuran.

It is essential that the organometallic polymer used in this invention should contain titanoxane linkages, zirconoxane linkages or both and siloxane linkages as structural units forming the polymer skeleton. If desired, it may also contain boroxane linkages and/or aluminoxane linkages as structural units for formation of the polymer skeleton.

In the present specification, the siloxane linkage is expressed by the simplified formula (-Si-O-) by convention. As is well known to those skilled in the art, however, the siloxane linkage expressed by the above formula includes three types of siloxane linkages, i.e. a difunctional group

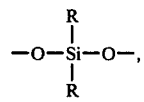

a trifunctional group of the formula

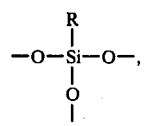

and a tetrafunctional group of the formula

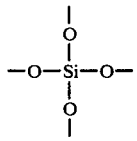

(wherein R is an organic group). These three types of the siloxane linkages are structural units forming the polymer skeleton. It is essential in this invention that most of the silicon atoms in the siloxane linkages ⁺Si—O⁺ in the organometallic polymer should contain bonded thereto at least one side-chain organic group R (alkyl or phenyl). This means that most of the siloxane linkages in the above polymer are difunctional or trifunctional siloxane linkages, and the proportion of tetrafunctional siloxane linkages is small. Generally, with an increase in the content of tetrafunctional siloxane linkages, the polymer has an increasing proportion of crosslinkages and becomes insoluble in organic solvents. The organometallic polymer used in this invention may contain a small proportion of tetrafunctional siloxane linkages, but this amount should be such that it does not bring about a deleterious effect on the solubility of the polymer in organic solvents. Preferably, the siloxane linkages of the polymer used in this invention consists substantially of difunctional and/or trifunctional siloxane linkages.

Likewise, the titanoxane linkages and zirconoxane linkages of formula ⁺Ti—O⁺ and ⁺Zr—O⁺ may include difunctional, trifunctional and tetrafunctional groups. But for the same reason as given hereinabove, in the polymer used in this invention, these linkages are mostly composed of difunctional groups and/or trifunctional groups, and the content of tetrafunctional groups is small. In this case, two side chains bonded to the metal atom (titanium or zirconium) of the difunctional groups, and one side chain bonded to the metal atom of the trifunctional groups are preferably alkoxy groups.

In the polymer used in this invention, the ratio of the total number of the titanoxane linkages and zirconoxane linkages to the total number of siloxane linkages is within the range of 99:1 to 1:99, preferably 30:1 to 1:30, more preferably 10:1 to 1:10.

Preferably, in the polymer used in this invention, the boroxane linkages expressed by formula ⁺B—O⁺ are

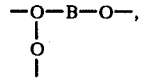

and the aluminoxane linkages expressed by formula —Al—O— are

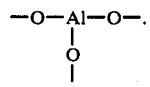

The total number of boroxane linkages and zirconoxane linkages is 0 to 10%, preferably 0 to 5%, more preferably 0 to 3%, based on the total number of siloxane linkages, titanoxane linkages and zirconoxane linkages.

The skeleton of the organometallic polymer used in this invention results from the random bonding of the siloxane linkages ⁺Si—O⁺ and at least one kind of mataloxane linkages ⁺M—O⁺ (M is Ti, Zr, B or Al), and may be of various structures such as linear, cyclic, ladder, cage or network structures.

The polymers used in this invention usually have a softening point of 50° to 500° C., a number average molecular weight of about 500 to 10000 and are soluble in organic solvents. They become inorganic when heated in an oxidizing atmosphere. To become inorganic means that the side chain organic groups are decomposed or liberated and consequently the organometallic polymer changes to an inorganic material.

The polymers used in this invention can be produced by synthesizing methods normally practiced to obtain polymetalloorganosiloxanes. Typical examples are as follows:

(a) Method involving co-hydrolysis of organochlorosilanes and metal alkoxides.

(b) Method involving dechlorinating condensation of organosilanols and metal chlorides.

(c) Method involving de-alcoholation condensation of organosilanols and metal alkoxides.

In the case of synthesizing the organometallic polymers used in this invention by the aforesaid methods (a), (b) and (c), the formation of the ⁺Si—O—M—O⁺ linkage is schematically shown as follows (M represents Ti, Zr, B or Al).

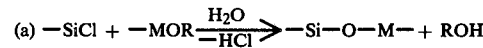

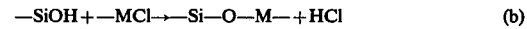

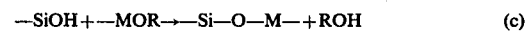

Synthesis of polymetalloorganosiloxanes is described in detail, for example, in Inorganic Polymers (F. G. A. Stone, Academic Press, 1962).

The process of this invention is directed to the production of crystallized glass using the above-described organometallic polymer as a nucleating agent.

In the first step of the process of this invention, glass in the form of a powder or molded article is coated with the organometallic polymer. This coating can be performed in various ways. When the glass is in the form of a powder, the coating operation may be performed as follows:

The organometallic polymer is dissolved in a solvent such as benzene, toluene, xylene, acetone or tetrahydrofuran to form a solution. Or the polymer is heat-melted to form a molten polymer. The glass powder is dipped in the resulting solution or the molten polymer, or the glass powder is uniformly mixed with the solution or the molten polymer. When the solvent is used, the solvent is removed to obtain a glass powder coated with the organometallic polymer. In the case of the glass article, the polymer solution or the molten polymer is coated on the surface of the glass article, or the glass article is dipped in the polymer solution or the molten polymer. Thus, a coated glass article can be obtained.

The next step in the process of this invention is a firing step. The resulting coated glass in the form of a powder or molded article is heated to a high temperature in an oxidizing atmosphere to fire it. When the glass powder is used as a starting material, the coated glass powder may be directly fired. Or if desired, the coated glass powder is first molded into an article of the desired shape and the resulting molded article is fired.

It is necessary that the firing should be carried out in an oxidizing atmosphere. The oxidizing atmosphere may be an atmosphere of air, oxygen, ozone, or oxygen diluted with inert gases.

The temperature of firing is a temperature sufficient to render the organometal polymer coated on the glass inorganic thereby forming a crystal nucleus for glass from the organometal polymer, and to crystallize at least a part of the glass by the cooperation of the action of this crystal nucleus and the heating operation. Generally, the firing temperature is about 600° to about 2100° C.

The mechanism by which crystallized glass is formed in accordance with the process of this invention has not yet been fully elucidated, but it is theorized as follows. When the glass coated with the organometallic polymer is fired in an oxidizing atmosphere, first the organometallic polymer becomes inorganic. The resulting inorganic material has affinity for glass, and therefore, at least a part of it diffuses into the glass whose viscosity has been lowered by the heat of firing. The silicon atoms, boron atoms and aluminum atoms forming the skeleton of the organometallic polymer are incorporated in the skeleton of the glass in the form of oxides. Titanium or zirconium atoms forming the skeleton of the polymer are difficult to incorporate into the glass skeleton, and are dispersed uniformly in the glass structure as ultrafine particles of titanium oxide or zirconium oxide. As the firing temperature further rises, the titanium oxide or zirconium oxide in the form of ultrafine particles becomes a crystal nucleus, and the glass structure gradually crystallizes. As a result, crystal grains form in the glass domain to give crystallized glass.

The crystal grains of the crystallized glass produced in accordance with this invention are extremely small with a size of usually about 200 A to about 10 microns and are very uniform. This is presumably because the ultrafine particles of titanium oxide or zirconium oxide uniformly dispersed in the glass structure form crystal nuclei that lead to the crystallization of glass. The size of the crystal grains can be controlled by varying various factors such as the firing temperature, the mixing ratio between the glass and the organometallic polymer, the composition of the starting glass.

Because of the small sizes and uniformity of the crystal grains, the crystallized glass produced by the process of this invention has superior mechanical strength such as high strength, modulus and hardness and superior thermal properties such as high thermal shock resistance. Furthermore, the crystallized glass has the superior property of being able to be worked mechanically into complex profiles by machining, drilling, cutting, etc. The worked surface of the crystallized glass is very smooth and is free from injuries such as cracking.

The weight ratio between the starting glass and the organometallic polymer can be varied over a wide range, and for example, 0.01 to 100 parts by weight of the organometallic polymer can be used per 100 parts by weight of the starting glass.

When a glass powder is used as the starting glass and the glass powder coated with the organometallic polymer is fired as such, a crystallized glass powder having high strength, modulus and hardness is obtained. This glass is useful, for example, as an abrasive material.

When the coated powdery glass is molded into the desired shape and then molded, there can be obtained a crystallized glass article in which crystal grains are present over the entire area of the molded article and which has good mechanical and thermal properties. Such a crystallized glass article can be produced by various methods. For example, the glass powder coated with the organometallic polymer is molded into the desired shape by a cold press, followed by firing. Or the coated glass powder may be subjected to a hot press to mold and fire it simultaneously, or it is possible to heat the glass powder coated with the organometallic polymer, and firing it while it is being molded into an article of the desired shape such as a rod, coil, pipe or sheet by such a procedure as extrusion molding.

When glass molded into the desired shape is used as the starting glass and it is coated with the organometallic polymer and then fired, there can be obtained a locally crystallized glass article in which the crystal grains exist only on the surface of the glass article or areas nearly. This molded article has very much increased mechanical strength by the compression stress from the surface to the inside which is generated by crystallization.

As stated hereinabove, the process of this invention has the great advantage that crystallized glass having superior properties can be produced by a simple process comprising the coating of glass with the organometallic polymer and the firing of the coated glass. It is economically advantageous over known processes for producing crystallized glass which require a complicated heating cycle.

The glass used as the starting material in the process of this invention is an amorphous solid inorganic substance, and can be defined as a material which is obtained by solidification without crystal alignment when cooling from the molten state. The process of this invention can be applied to such glasses in general. Glasses which are especially suitable for use as starting materials in the process of this invention include ordinary oxide glasses such as silicate glass, aluminosilicate glass, borate glass, borosilicate glass, and phosphosilicate glass. Preferred starting glasses are $Li_2O—Al_2O_3—SiO_2$,
$Na_2O—Al_2O_3—SiO_2$,
$MgO—Al_2O_3—SiO_2$,
$Na_2O—CaO—MgO—SiO_2$,
$PbO—ZnO—B_2O_3$,
$ZnO—B_2O_3—SiO_2$,
$MgO—CaO—Al_2O_3—SiO_2$,
$MgO—ZnO—Al_2O_3—SiO_2$,
$MnO—Al_2O_3—SiO_2$,
$Li_2O—MgO—Al_2O_3—SiO_2$,
$Li_2O—K_2O—Al_2O_3—SiO_2$, and
$Li_2O—Al_2O_3—PbO—SiO_2$.

The crystallized glass obtained by the process of this invention is useful in a wide range of applications. It is especially useful as artificial marbles and wall materials; electrical parts and appliances such as substrate boards, packages, electrically insulator parts and high-frequency insulator parts; and household goods such as cooking utensils, tableware and washing units.

In an especially useful modified embodiment of this invention, there is provided a process for producing a ceramics-crystallized glass composite article using the crystallized glass produced by the process of this invention.

Generally, ceramics have poor self-sintering property. In order to obtain sintered ceramic bodies, ceramics are fired at very high temperatures, or at high temperatures and pressures, or in the presence of a sintering aid added. It is well known that ceramic sintered bodies having a very low porosity produced by these conventional methods have high strength at high temperatures, but suffer from poor toughness and mechanical workability. For example, the ceramics sintered bodies have only limited applications in film resistance cores, print circuit base boards and electronics component part packages because they have low toughness and poor workability, especially poor machinability and drillability, despite their excellent electric insulating property.

The ceramics-crystallized glass composite article produced by utilizing the crystallized glass obtained by the process of this invention is conducive to the improvement of the toughness and workability of the conventional ceramics sintered bodies having a very low porosity. The ceramics-crystallized glass composite article can be produced by mixing at least one ceramic material selected from powders, flakes and fibers of ceramics, a glass powder and the organometallic polymer specified by the present invention optionally together with an organic solvent, molding the resulting mixture and firing the molded article in an oxidizing atmosphere, or molding and firing the mixture simultaneously in an oxidizing atmosphere, thereby to bond the ceramic material by the glass at least partly crystallized. This process results in a composite in which the ceramics and the crystallized glass are bonded densely.

The resulting composite article has very good mechanical properties such as strength and hardness and very good thermal properties such as thermal shock resistance, and can be worked into complex profiles by machining, drilling, cutting.

Suitable ceramics used in the aforesaid process are those composed of at least one of carbon, boron, metal oxides, metal nitrides, metal silicides and metal borides. Metal carbonitrides, metal carbosilicides, metal carboborides, metal borosilicides, metal carbosiliconitrides, metal carbosiliconitroborides, etc. may also be used.

The ceramics are in the form of powders, flakes and fibers. Porous granular ceramics can also be used.

Examples of ceramics compositions are $SiO_2$, $SiO_2$-$Al_2O_3$, $Al_2O_3$, $Al_2O_3$-$Ga_2O_3$, $ZrO_2$, $ZrO_2$-$CaO$, $Al_2O_3$-$ZrO_2$, $Al_2O_3$-$Cr_2O_3$, $MgO$, $MgO$-$CaO$, $MgO$-$Cr_2O_3$, $MgO$-$SiO_2$, C, SiC, $Si_3N_4$, $Si_3N_4$-$Al_2O_3$, BN, $TiB_2$, $ZrB_2$, $HfB_2$, $NbB_2$, $TaB_2$, $TiB_2$-BN, $TiB_2$-$B_4C$-SiC-Si, and $ZrB_2$-SiC.

The glass used in the production of the ceramics-crystallized glass composite means the glasses defined hereinabove, and this glass is not embraced in the ceramics described above.

In the production of the ceramics-crystallized glass article, the mixing ratio between the glass powder and the organometallic polymer is such that 0.01 to 50 parts by weight of the organometallic polymer is used per 100 parts by weight of the glass. The ratio of the total amount of the glass powder and the polymer to the amount of the ceramics may be from 100:0.1 to 0.1:100 by weight.

According to this invention, ceramics can be used in the form of fibers, and a ceramics-crystallized glass composite article can be produced in which the ceramic fibers are bonded with the crystallized glass.

When ceramics fibers are to be bonded by a method of producing crystallized glass using a conventional nucleating agent of a non-metallic compound, the aforesaid melting-cooling-heating process is required for the crystallization of the glass. Accordingly, the melting and the long-term crystallizing heat-treatment cause the fibers to fuse with the glass and to disappear. Or the fibers break at various points owing to the high temperature reaction. According to the present invention, a green molded article containing the ceramic fibers, the glass powder and the organometallic polymer is heated, and is annealed immediately after the glass is half-melted or melted, thereby making it possible to form crystallized glass which is at least partly crystallized. Hence, the ceramic fibers are substantially free from any damage by the crystallized glass. As a result, there can be produced a composite article having high strength, hardness and toughness and good mechaical workability in which the matrix of the crystallized glass is reinforced with the ceramic fibers.

The following Examples illustrate the present invention.

EXAMPLE 1

Three moles of diphenylsilane diol and 2 moles of titanium tetrabutoxide were weighed, and xylene was added. The mixture was refluxed in an atmosphere of nitrogen at 150° C. for 1 hour. After the reaction, the insoluble matter was removed by filtration, and the xylene solvent was removed by an evaporator. The resulting intermediate product was heat-polymerized in a stream of nitrogen at 300° C. for 1 hour to afford a yellow clear polymer. The infrared absorption spectrum of this polymer was measured, and the results are shown in FIG. 1. The spectral chart showed a slight Si—OH absorption at about 3600 cm$^{-1}$, an absorption of $C_4H_9$ at about 2900 cm$^{-1}$, an absorption of the benzene ring at about 1600 cm$^{-1}$ and 1400 cm$^{-1}$, an absorption of Si-O at 1150–1000 cm$^{-1}$, and an absorption of Ti-O in the Ti-O-Si linkage near 900 cm$^{-1}$. Thus, the resulting polymer was found to have a skeleton containing Ti, Si and O with a phenyl group bonded to Si as a side chain and a butoxy group bonded to Ti as a side chain.

92% by weight of a glass powder (average particle diameter 1 micron) composed of, by weight, 52% $SiO_2$, 34% $Al_2O_3$, 10% MgO and 4% CaO, and 8% by weight of the polymer prepared as above were taken, and benzene was added. The mixture was stirred, and then benzene was removed by heating. The resulting polymer coated glass powder was cold-pressed under 4000 kg/cm$^2$, then heated in the air at a rate of 400° C./hr, and maintained at 1300° C. for 20 minutes to obtain crystallized glass. The resulting glass had a flexural strength of 30 kg/mm$^2$. This strength value did not change even when the crystallized glass was heated to 450° C. The crystallized glass did not break even when it was heated at 1000° C. and then put into water.

EXAMPLE 2

10% by weight of the polymer prepared in Example 1 was added by the same procedure as in Example 1 to a glass powder (average particle diameter 1 micron) composed of 10 mole% $CeO_2$, 20 mole% $Na_2O$ and 70 mole% $SiO_2$. The resulting polymer-coated glass powder was heated in the air to 900° C. at a rate of 450° C. without pressurization, and maintained at 900° C. for 1 hour to form a crystallized glass powder. X-ray diffraction analysis of the product showed that fine crystals (about 600 A) $CeO_2$ and $SiO_2$ were precipitated. Hence, the resulting crystallized glass is useful as an abrasive material.

EXAMPLE 3

A polymer having a skeleton containing Zr, Si and O with phenyl attached to Si as a side chain and butoxy attached to Zr as a side chain was produced under the same conditions as in Example 1 except that the amount of the diphenylsilane diol was changed to 4 moles, 1 mole of zirconium tetrabutoxide was used instead of 2 moles of titanium tetrabutoxide, and the heat polymerization was carried out at 350° C. under vacuum ($10^{-1}-10^{-3}$ mmHg) for 20 minutes instead of performing the heat-polymerization in an atmosphere of nitrogen at 300° C. for 1 hour.

93% by weight of a glass powder (average particle diameter 1 micron) composed of, by weight, 66% $SiO_2$, 7% $Al_2O_3$, 13% $Li_2O$ and 14% MgO and 7% by weight of the polymer prepared as above were taken, and xylene was added. The mixture was stirred, and xylene was removed by heating. The resulting polymer-coated glass powder was heated to 1000° C. at a rate of 500° C./hr under a pressure of 100 kg/cm$^2$ in the air, and maintained at 1000° C. for 10 minutes. The crystallized glass had a flexural strength of 27 kg/cm$^2$ at room temperatures. When the crystallized glass was heated to 1000° C., it was not deformed. When the crystallized glass was heated at 1000° C. and put into water, it did not break.

EXAMPLE 4

A polymer having a skeleton containing Ti, Si, B and O with a phenyl group attached to Si as a side chain and an isopropoxy group attached to Ti as a side chain was produced by heat-polymerizing 2 moles of diphenylsilane diol, 2 moles of titanium tetraisopropoxide and 1 mole of boron in the absence of solvent in an atmosphere of nitrogen at 250° C. for 2 hours.

85% by weight of a glass powder (average particle diameter 1 micron) composed of, by weight, 81% $SiO_2$, 12% $Al_2O_3$, 2% $B_2O_3$, 0.5% CaO, 0.5% MgO and 4% $Na_2O$, and 15% by weight of the polymer produced as above were taken, and benzene was added. The mixture was stirred, and then benzene was removed by heating. The resulting polymer-coated glass powder was cold-pressed at 4000 kg/cm$^2$, heated in the air to 1000° C. at a rate of 400° C./hr, and maintained at this temperature for 20 minutes to obtain crystallized glass. The crystallized glass had a flexural strength at room temperature of 16 kg/mm$^2$, and could be drilled by a drill for concrete. The holes were observed under a microscope, but no microcrack due to mechanical working was noted.

EXAMPLE 5

A polymer having a skeleton containing Zr, Si, B and O with a methyl group attached to Si as a side chain and a butoxy group attached to Zr as a side chain was produced under the same conditions as in Example 4 using 1 mole of dimethylsilane diol, 3 moles of zirconium tetrabutoxide and 1 mole of boric acid.

90% by weight of the same glass powder as used in Example 4 and 10% by weight of the polymer produced as above were taken, and benzene was added. The mixture was stirred, and benzene was removed by heating. The resulting polymer-coated glass powder was cold-pressed at 4000 kg/cm$^2$, heated to 1000° C. at a rate of 400° C./hr, and maintained at this temperature for 20 minutes to obtain crystallized glass. The crystallized glass had a flexural strength of 18 kg/mm$^2$ at room temperature, and could be mechanically worked (by machining, drilling, cutting). It was found to have good thermal shock resistance.

EXAMPLE 6

A polymer having a skeleton containing Ti, Zr, Si and O with a methyl group attached to Si as a side chain and an isopropoxy group attached to Zr as a side chain was produced under the same conditions as in Example 1 except that 3 moles of dimethylsilane diol, 1.8 moles of titanium tetraisopropoxide and 0.2 mole of zirconium tetraisopropoxide were used as starting materials, and the resulting intermediate product was heat-polymerized in an atmosphere of nitrogen gas at 330° C. for 1 hour.

90% by weight of the same glass powder (average particle diameter 1 micron) as used in Example 1 and 10% by weight of the polymer produced as above were taken, and benzene was added. The mixture was stirred, and benzene was removed by heating. The resulting polymer-coated glass powder was cold-pressed at 4000 kg/cm$^2$, heated to 1300° C. in the air at a rate of 400° C./hr and maintained at this temperature for 20 minutes to obtain crystallized glass. The resulting crystallized glass had a flexural strength of 32 kg/mm$^2$. This value did not change even when the crystallized glass was heated to 450° C. This crystallized glass withstood mechanical working, and even when it was heated at 1000° C. and put into water, it did not break.

EXAMPLE 7

A polymer having a skeleton containing Ti, Zr, Si, B and O with a phenyl group attached to Si as a side chain and a butoxy group attached to Ti and Zr as a side chain was produced by using 2 moles of diphenylsilane diol, 1.5 moles of titanium tetrabutoxide, 0.5 mole of zirconium tetrabutoxide and 1 mole of boric acid, and heat-polymeerizing them in vacuum ($10^{-1}$–$10^{-3}$ mmHg) at 280° C. for 30 minutes.

90% by weight of the same glass powder (average particle diameter 1 micron) as used in Example 3 and 10% by weight of the polymer produced as above were taken, and benzene was added. The mixture was stirred, and benzene was removed by heating. The resulting polymer-coated glass powder was heated in the air to 1300° C. at a rate of 500° C./hr under a pressure of 100 kg/cm$^2$, and maintained at this temperature for 10 minutes, followed by extrusion from a carbon nozzle to obtain a pillar-like sample. The resulting sample of crystallized glass had a flexural strength of 30 kg/mm$^2$ at room temperature. It was not deformed even when it was heated to 1200° C. It did not break even when it was heated at 1000° C. and put into water.

EXAMPLE 8

The surface of a commercially available Pyrex glass plate (5 mm thick) was coarsened with No. 320 emery paper, washed with an organic solvent, and dried. A solution of 2 g of the polymer obtained in Example 1 in 10 cc of benzene was sprayed onto the treated surface of the glass plate, and benzene was removed. The resulting polymer-coated glass plate was heated in the air to 950° C. A reinforced glass plate consisting of the Pyrex glass plate and crystallized glass layer having a thickness of about 30 microns formed thereon was obtained.

The following Examples 9 to 15 show the production of a composite article in accordance with this invention.

EXAMPLE 9

3% by weight of the same polymer as used in Example 1, 7% by weight of the same glass powder (average particle diameter 1 micron) as used in Example 1 and 90% by weight of forsterite, $2MgO \cdot SiO_2$, (average particle diameter 1 micron) were taken, and benzene was added. The mixture was stirred, and then the benzene was removed by heating.

The resulting powder was formed into a sheet having a thickness of 3 mm by using rolls, and passed slowly through a horizontal furnace to fire it continuously. The maximum heating temperature reached was 1300° C. The resulting fired forsterite sheet had a flexural strength at room temperature of 18 kg/mm$^2$ and excellent electrical insulation and high-frequency insulation. Its surface was extremely smooth. It also had good mechanical workability, and could be drilled by a drill for concrete. The holes made by the drill were observed under a microscope, but no microcrack attributed to mechanical working was noted.

The resulting fired product was thus found to be useful as a film resistance core or a printed circuit base board.

EXAMPLE 10

The procedure of Example 9 was repeated except that alumina powder (average particle diameter 1 micron) was used instead of the forsterite, and the maximum heating temperature reached was adjusted to 1400° C. The resulting fired alumina sheet had a flexural strength of 22 kg/mm$^2$ and excellent electrical insulating property, high-frequency insulating property and mechanical workability, and was found to be useful as an electronics component package.

EXAMPLE 11

4% by weight of the same polymer as used in Example 3, 6% by weight of the same glass powder (average particle diameter) and 90% by weight of magnesium oxide powder having an average particle diameter of 1 micron were taken, and xylene was added. The mixture was stirred, and then the xylene was removed by heating. While the resulting powder was being pressed under 300 kg/cm$^2$, it was heated at a rate of 400° C./hr, and maintained at 1300° C. for 20 minutes (hot-pressing). The resulting fired magnesium oxide article had a flexural strength at room temperature of 20 kg/mm$^2$, a high thermal conductivity and superior mechanical workability, and was found to be applicable to ceramics component parts.

EXAMPLE 12

60% by volume of the polymer-coated glass powder prepared by the method of Example 4 and 40% by volume of carbon fibers having an average diameter of 20 microns were laminated in one direction in a stainless steel hot-pressing device, and heated to 400° C. in the air and then to 1100° C. in argon. As soon as the temperature reached 1100° C., the assembly was pressed under 100 kg/cm$^2$. The resulting composite article consisted of crystallized glass as a matrix and the carbon fibers as a reinforcing material, and had a flexural strength of 27 kg/mm$^2$.

EXAMPLE 13

10% by weight of the same polymer as used in Example 5, 10% by weight of the same glass powder (average particle diameter 1 micron) as used in Example 1 and 80% by weight of SiC powder having an average particle diameter of 10 microns were taken, and a small amount of xylene was added. They were kneaded, and the xylene was removed by heating. While the resulting powder was pressed at 300 kg/cm$^2$ it was heated at a temperature of rate of 400° C./hr in the air and maintained at 1300° C. for 20 minutes (hot pressing). The resulting SiC article had a flexural strength at room temperature of 22 kg/mm$^2$.

EXAMPLE 14

60% by volume of polymer-coated glass powder prepared by the method of Example 6, and 40% by volume of SiC fibers having an average diameter of 20 microns were laminated in one direction in a stainless steel hot-pressing device, and heated to 1200° C. in the air. As soon as this temperature was reached, the assembly was pressed at 100 kg/cm$^2$. The resulting composite article consisted of crystallized glass as a matrix and the SiC fibers as a reinforcing material, and had a flexural strength of 28 kg/mm$^2$.

EXAMPLE 15

10% by weight of the same polymer as used in Example 7, 10% by weight of the same glass powder (average particle diameter 1 micron) as used in Example 1 and 80% by weight of $Si_3N_4$ powder having an average particle diameter of 10 microns were taken, and a small amount of xylene was added. They were kneaded, and then the xylene was removed by heating. While the resulting powder was pressed at 300 kg/cm$^2$, it was heated in the air at a rate of 400° C./hr and maintained at 1300° C. for 20 minutes (hot pressing). The resulting $Si_3N_4$ molded article had a flexural strength at room temperature of 20 kg/mm$^2$.

What we claim is:

1. A process for producing crystallized glass having superior mechanical properties and thermal properties, which comprises
    (1) coating glass in the form of a powder or molded article with an organometallic polymer, said polymer being soluble in an organic solvent and having a skeleton comprising (a) titanoxane linkages +Ti—O+ or zirconoxane linkages +Zr—O+ or both and (b) siloxane linkages +Si—O+ in which most of the silicon atoms have as a side chain at least one organic group selected from alkyl and phenyl groups, and optionally (c) boroxane linkages +B—O+ or aluminoxane linkages +Al—O+ or both; and
    (2) firing the resulting polymer-coated glass in an oxidizing atmosphere to crystallize at least a part of the glass.

2. The process of claim 1 wherein the ratio of the total number of the titanoxane linkages and zirconoxane linkages to that of the siloxane linkages is within the range of from 99:1 to 1:99.

3. The process of claim 1 or 2 wherein the total number of the boroxane linkages and aluminoxane linkage is 0 to 10% of the total number of the siloxane linkages, titanoxane linkages and zirconoxane linkages.

4. The process of claims 1 or 2 wherein said starting glass is in the form of a powder, and the polymer coated powder is directly fired.

5. The process of claim 1 or 2 wherein said starting glass is in the form of a powder, and the resulting polymer-coated glass powder is molded into the desired shape prior to said firing.

6. The process of claim 1 or 2 wherein said starting glass is in the form of a molded article.

7. The process of claim 1 or 2 wherein said starting glass is selected from the group consisting of silicate glass, aluminosilicate glass, borate glass, borosilicate glass and phosphosilicate glass.

8. A process for producing a ceramics-crystallized glass composite article having superior mechanical properties, thermal properties and mechanical workability, which comprises (1) mixing at least one ceramic material selected from powders, flakes and fibers of ceramics, a glass powder and an organometallic polymer in the optional presence of an organic solvent, said polymer being soluble in an organic solvent and having a skeleton comprising (a) titanoxane linkages $+Ti-O+$ or zirconoxane linkage $+Zr-O+$ or both and (b) siloxane linkages $-Si-O-$ in which most of the silicon atoms have as a side chain at least one organic group selected from alkyl and phenyl groups, and optionally (c) boroxane linkages $+B-O+$ or aluminoxane linkage $+Al-O+$ or both; and (2) either (i) molding the resulting mixture and then firing the molded article in an oxidizing atmosphere or (ii) molding and firing the resulting mixture simultaneously in an oxidizing atmosphere, thereby to bond said ceramic material by the glass at least partly crystallized.

9. The process of claim 8 wherein said ceramics are selected from the group consisting of carbon, boron, metal oxides, metal nitrides, metal silicides and metal borides and when carbon is present a protective inert atmosphere is employed at firing temperatures above those at which the organometallic polymer becomes inorganic.

* * * * *